(12) United States Patent
Heo et al.

(10) Patent No.: US 11,378,527 B2
(45) Date of Patent: Jul. 5, 2022

(54) APPARATUS AND METHOD FOR INSPECTING BATTERY CELLS FOR AUTOMATION OF TOTAL INSPECTION

(71) Applicant: VIEWORKS CO., LTD., Anyang-si (KR)

(72) Inventors: Kang Heo, Yongin-si (KR); Sang Woo Son, Anyang-si (KR); Gwan Su Lee, Gunpo-si (KR); Doo Ho Kim, Anyang-si (KR)

(73) Assignee: VIEWORKS CO., LTD., Anyang-si (KR)

( * ) Notice: Subject to any disclaimer, the term of this patent is extended or adjusted under 35 U.S.C. 154(b) by 219 days.

(21) Appl. No.: 15/930,365

(22) Filed: May 12, 2020

(65) Prior Publication Data

US 2020/0363344 A1     Nov. 19, 2020

(30) Foreign Application Priority Data

May 14, 2019   (KR) ......................... 10-2019-0056389

(51) Int. Cl.
*G01N 23/00* (2006.01)
*G01N 23/04* (2018.01)
(Continued)

(52) U.S. Cl.
CPC ......... *G01N 23/046* (2013.01); *G01N 23/083* (2013.01); *G01N 23/18* (2013.01); *G01N 2223/643* (2013.01); *G01N 2223/645* (2013.01)

(58) Field of Classification Search
CPC .... G01N 23/18; G01N 23/046; G01N 23/083; G01N 2223/645; G01N 2223/643; G01N 2223/1016; G01N 23/04; G01N 23/087; G01N 23/20; G01N 23/10; G01N 2223/642; G01N 2223/652; G01N 21/89;
(Continued)

(56) References Cited

U.S. PATENT DOCUMENTS 9,022,652 B2   5/2015   Chupas et al.
2002/0166802 A1  11/2002  Jung et al.
(Continued)

FOREIGN PATENT DOCUMENTS

DE    102012004064 A1    9/2013
JP       S61240145 A     10/1986
(Continued)

*Primary Examiner* — Irakli Kiknadze
(74) *Attorney, Agent, or Firm* — Rabin & Berdo, P.C.

(57) ABSTRACT

The present invention relates to an apparatus and a method for inspecting battery cells for automation of total inspection. To this end, the present invention is configured such that test objects are sequentially stacked on a test object casing provided on an upper portion of a mounting stage of a main stage, images of the test objects are obtained by radiography after the test object casing is moved to a test object inspection unit, and the test objects stacked on the test object casing are unloaded to the outside after the images are obtained. Accordingly, the present invention enables total inspection to be performed on battery cells, which are the test objects, in order to quickly divide good and defective products, and solves a delay of a flow rate caused by X-ray inspection of the test object inspection unit in order to improve productivity and efficiency.

20 Claims, 15 Drawing Sheets

(51) Int. Cl.
*G01N 23/046* (2018.01)
*G01N 23/18* (2018.01)
*G01N 23/083* (2018.01)

(58) Field of Classification Search
CPC .... G01N 23/02; G01N 21/88; G01N 21/8806;
G01N 21/9515; G01N 23/043; G01N
2021/845; G01N 2223/646; G01N 23/16;
G01V 5/0016; H01M 10/48; H01M
10/04; H01M 10/0585; H01M 10/4285;
H01M 10/0404; H01M 10/441; H01M
10/482; B65G 57/11; B65G 59/02; B65G
37/00; B65G 61/00; B65G 47/914; G06T
7/13; H05G 1/36; H05G 1/265; H05G
1/38; H05G 1/12; H05G 1/34; H05G
1/26; H05G 1/08; H05G 1/10; H05G
1/30; H05G 1/56; H05G 1/54; H05G
1/32; A61B 6/44; A61B 6/4208; A61B
6/4429; A61B 6/4435; A61B 6/42; A61B
6/4233; A61B 6/4452; A61B 6/4405;
A61B 6/56; A61B 6/4283; Y02P 70/50;
Y02E 60/10
USPC .............................. 378/4, 20, 62–68, 208, 57
See application file for complete search history.

(56) References Cited

U.S. PATENT DOCUMENTS

| | | | |
|---|---|---|---|
| 2008/0137807 A1* | 6/2008 | Yukisada | G01N 23/223 378/45 |
| 2011/0096900 A1* | 4/2011 | Park | G01N 23/083 378/51 |
| 2011/0176661 A1* | 7/2011 | Li | G01N 23/083 429/246 |
| 2012/0121968 A1* | 5/2012 | Nakagawa | H01M 4/70 429/163 |
| 2013/0340813 A1* | 12/2013 | Momozaki | H01L 31/022425 438/66 |
| 2014/0272543 A1* | 9/2014 | Devan | H01M 10/0436 429/162 |
| 2017/0162912 A1* | 6/2017 | Ueno | H01M 4/505 |
| 2017/0256822 A1* | 9/2017 | Onoda | H01M 4/131 |

FOREIGN PATENT DOCUMENTS

| | | |
|---|---|---|
| JP | 2010102901 A | 5/2010 |
| JP | 2012164620 A | 8/2012 |
| KR | 10-1133048 B1 | 4/2012 |
| KR | 101272556 B1 | 6/2013 |
| KR | 10-2016-0068414 A | 6/2016 |
| KR | 20170016179 A | 2/2017 |

* cited by examiner

[Prior Art]

APPARATUS AND METHOD FOR INSPECTING BATTERY CELLS FOR AUTOMATION OF TOTAL INSPECTION

CROSS-REFERENCE TO RELATED APPLICATIONS

This application claims priority to and the benefit of Korean Patent Application No. 10-2019-0056389 filed in the Korean Intellectual Property Office on May 14, 2019, the entire contents of which are incorporated herein by reference.

TECHNICAL FIELD

The present invention relates to an apparatus for inspecting battery cells for automation of total inspection, and more particularly, to an apparatus for inspecting battery cells, the apparatus being capable of capturing images of a plurality of stacked battery cells by using radioactive rays such as X-rays, thereby enabling total inspection to be performed on battery cells produced by a consistent process, and accurately and quickly inspecting all of the produced battery cells for the presence or absence of defects.

BACKGROUND ART

A lithium polymer battery, which is a kind of secondary battery, is a battery that may be repeatedly charged and discharged while reversibly performing mutual conversion between chemical energy and electrical energy. In general, such a lithium polymer battery includes an electrolyte, and a positive electrode, a negative electrode, a separator, and an encapsulant which are immersed in the electrolyte.

The electrolyte is a medium for material transfer that harmonizes a redox reaction between the positive electrode and the negative electrode. The positive electrode is an electrode in which materials receiving electrons from the outside are reduced, and the negative electrode is an electrode that emits electrons while being oxidized. The separator serves as a partition that prevents physical contact between the positive electrode and the negative electrode.

The encapsulant is configured in the form of an aluminum laminated film having a multilayer structure including an outer layer film, a bonding agent, an aluminum foil, an adhesive, and an inner layer film so as to have mechanical flexibility, strength, a high effect of blocking oxygen/moisture vapor, high intensity of thermal sealing, chemical resistant to electrolytes, electrical insulation, ease of molding, simplicity of size control, printability, thermal stability, and low unit production costs.

In general, during a process of manufacturing the lithium polymer battery, a corner of the battery is sometimes bent and the positive electrode and the negative electrode provided inside the encapsulant are sometimes short-circuited due to the bending of the corner of the battery. The use of the battery having the bent corner or the short-circuited positive and negative electrodes may not only cause a malfunction in a product but also result in an explosion of a battery cell.

For this reason, in order to inspect the state of the electrodes inside the encapsulant of the produced battery, the battery having the deformed electrode is detected by using a commercially available manual X-ray inspection (MXI) apparatus which is a kind of non-destructive inspection equipment. However, there is a limitation in that the total inspection is impossible because the inspection is performed through the processes of sampling one specific battery, at predetermined time intervals, from the batteries transferred by the conveyor belt in the production line, manually loading the battery into the commercially available MXI apparatus, and acquiring and analyzing an image of the battery.

In order to overcome the limitation of the above-mentioned sampling inspection in the related art, there has been proposed a battery inspection apparatus as disclosed in Korean Patent No. 101133048.

The proposed battery inspection apparatus in the related art is used to inspect an aligned state (stacking alignment) of a positive electrode, a separator, and a negative electrode, that is, whether the positive electrode, the separator, and the negative electrode are clearly divided and stacked in medium and large plate-shaped batteries which have predetermined thicknesses and are applied to hybrid electric vehicles, notebook computers, and the like. As illustrated in FIG. 1A, the battery inspection apparatus includes a loading unit 2, an unloading unit 3, a transfer unit 4, and an inspection device 7.

In the battery inspection apparatus in the related art illustrated in FIG. 1A, a series of processes are sequentially performed, in which a battery is set on a loading jig 21 positioned at a lower side of the loading unit 2, the loading jig 21 on which the battery is set is moved upward along a loading route 22, the battery is set on transfer jigs 41 and 42 of the transfer unit 4, as illustrated in FIG. 1B, the battery is moved to an upper side of the transfer unit 4, images of inspection points are captured by the inspection device 7, the transfer jigs 41 and 42 on which the battery is set are moved to a lower side of the transfer unit 4 after capturing the images, the battery is set on an unloading jig 31 positioned at an upper side of the unloading unit 3, the unloading jig 31 is moved downward along an unloading route 32, and thus the battery is unloaded.

As illustrated in FIG. 1B, the transfer jig 41 is configured to be rotated so that images of two corners of the battery, which are the inspection points, may be captured by an X-ray inspection device 71 and an image intensifying tube 72. As exemplarily illustrated, the transfer jig 41 is rotated clockwise by 45 degrees and counterclockwise by 45 degrees, such that the images are captured at the corresponding positions.

The above-mentioned battery inspection apparatus in the related art is advantageous in that one battery may be inspected while another battery is loaded or unloaded, such that the battery inspection may be performed at a greatly improved speed in comparison with the inspection in the sampling manner in the related art.

However, the battery inspection apparatus configured as described above can capture only two-dimensional images of the two corners of the battery. In order to perform a more precise inspection, three-dimensional images are reconstructed from a lot of two-dimensional images captured by rotating the corners of the battery and then the inspection is performed. However, it takes several minutes to capture images of one battery, which causes a serious restriction to a process speed. For this reason, the battery inspection apparatus in the related art is still not suitable as the total inspection equipment for the recent battery production process.

It has been known that a transfer speed (flow rate) is about 8 seconds in the battery cell production line at the current technology level. In the case of full-CT (computerized tomography) imaging that reconstructs three-dimensional images from a lot of two-dimensional images, it takes at least about two minutes to rotate the battery for the full-CT and reconstruct the three-dimensional images from the acquired images. For this reason, the total inspection cannot be performed by the above-mentioned battery inspection apparatus in the related art.

SUMMARY OF THE INVENTION

The present invention has been made in an effort to provide an apparatus for inspecting battery cells for automation of total inspection, which improves productivity and efficiency by considerably improving a process speed required for the inspection of the battery so that total inspection is possible even in a case in which battery cells are inspected by reconstructing three-dimensional images from many two-dimensional images acquired by rotating corners of batteries in order to perform a more precise inspection, thereby solving the problems of the battery inspection apparatus in the related art.

The present invention has also been made in an effort to provide an apparatus for inspecting battery cells for automation of total inspection, which may be configured to inspect a plurality of battery cells at the same time, unlike the inspection apparatus in the related art, such that battery cells are stacked on an inspection apparatus during the time taken to simultaneously and accurately inspect corners of the plurality of battery cells, thereby smoothly performing the inspection on the battery cells while maintaining a consistent process of producing batteries.

Technical problems to be solved by the present disclosure are not limited to the above-mentioned technical problems, and other technical problems, which are not mentioned above, may be clearly understood from the following descriptions by those skilled in the art to which the present disclosure pertains.

An exemplary embodiment of the present invention provides an apparatus for inspecting battery cells for automation of total inspection, the apparatus being configured to inspect the battery cells with radiography and including: a main stage configured to be rotatable; a sub-stages placed on the main stage; a mounting stage comprising the main stage and the sub-stages; a test object casing placed on each of the sub-stages so that test objects are stacked on the test object casing; and a test object inspection unit configured to acquire images of the test objects by radiography at a position at which the test object casing is moved by the mounting stage.

In the battery cell inspection apparatus according to the present invention, after the images are acquired, the stacked test objects may be sequentially unloaded from the test object casing at a position at which the test object casing is positioned by the movement of the mounting stage.

The main stage may be provided to be rotatable about a center of the main stage, the sub-stages may be disposed on an upper portion of the main stage at predetermined intervals in a circumferential direction in order to load, inspect, and unload the test objects, a rotation and a height of each of the sub-stages are adjusted, and the test object inspection unit may acquire images of corners of the stacked test objects by rotating the test object casing.

The mounting stage and the test object inspection unit may be positioned in a casing, the three or more sub-stages may be mounted on an upper portion of the rotatable main stage in order to load, inspect, and unload the test objects, the test object inspection unit may include a radioactive ray generating unit and an imaging detector in order to perform radiographic inspection on the test objects, and a test object alignment unit may be provided above the test object inspection unit.

The casing may include: a shield unit provided to surround the casing in order to prevent radioactive rays from leaking; a test object inlet port provided at one side of the casing including the shield unit; and a test object outlet port provided at the other side of the casing including the shield unit and configured to correspond to the test object inlet port.

An input conveyor belt, which penetrates the casing between the inside and the outside, may be disposed in the test object inlet port, test object guide plates may be disposed on an upper portion of the input conveyor belt, and an output conveyor belt, which penetrates the casing between the inside and the outside, may be disposed in the test object outlet port.

The main stage positioned on a bottom surface of a lower portion of the casing may be rotated by a first motor, the sub-stage positioned on the upper portion of the main stage may be rotated on the main stage by a second motor, and the sub-stage may include a first lifting unit that moves the sub-stage upward or downward.

The test object casing on which the test objects are sequentially stacked may be placed on the upper portion of the sub-stage, a push-up actuator is provided on the upper portion of the sub-stage positioned at the center where the test object casing is seated and separated, and the test object casing may include: a casing body having extension portions integrally provided at both ends of a quadrangular flat plate portion, the extension portions each having a triangular shape and extending outward; casing legs protruding downward from four corners of the quadrangular flat plate portion; casing support members protruding upward and downward from ends of the extension portions; casing cover unlocking units provided on upper portions of the casing support members; test object stage units symmetrically provided at both sides of an upper portion of the casing body; and a test object cover configured to cover the upper portion of the casing body and be unlocked by the casing cover unlocking units.

The casing cover unlocking unit may include: an insertion groove provided on an upper portion of the casing support member and having a L shape; an electromagnet fixedly inserted into a vertical portion of the insertion groove; an inner connection terminal inserted into a horizontal portion of the insertion groove and connected to the electromagnet; and an outer connection terminal unit connected to the inner connection terminal. The outer connection terminal unit may be provided to protrude inside a connection terminal pressing member that comes into contact, in a > shape, with an outer surface of the casing support member.

An outer side of a corner of the connection terminal pressing member may be coupled to a slip unit provided on a pressing cylinder rod of a pressing cylinder, and the slip unit may include: a slip housing; a slip motor provided in the slip housing; and a slip disc terminal provided on a slip motor shaft of the slip motor.

Each of the test object stage unit may include: a third motor provided at either side of a first long hole provided in the quadrangular flat plate portion, the third motor having a third motor shaft protruding upward; a test object stage coupled to the third motor shaft; and test object alignment pieces protruding from one side or the other side of an upper portion of the test object stage.

The test object alignment pieces may have an angle of 90° therebetween, and test object corner exposing portions may be spaced apart from each other and provided at the corners of the test objects which face each other.

The test object cover may have the same shape as the casing body, a metal piece, which is coincident with a center of the electromagnet, may be provided at a portion of the test object cover which is placed on the casing support member, and the test object cover may have a second long hole at a center thereof.

The test object alignment unit may include: an alignment support frame unit; an alignment plate transfer cylinder unit provided below the alignment support frame unit; an alignment plate coupled to a lower portion of the alignment plate transfer cylinder unit; a plurality of alignment cylinders provided on a lower portion of the alignment plate; and a test object cover suction unit provided on the alignment plate and configured to suck the test object cover with air suction power and separate the test object cover.

The alignment cylinders may be provided on the lower portion of the alignment plate and may have an interval of 90° therebetween, and test object alignment plates may be provided at ends of alignment cylinder rods of the alignment cylinders.

The test object cover suction unit may include: an air pump; an air hose having one side connected to a suction side of the air pump; and a suction nozzle provided on the alignment plate and connected to the other side of the air hose.

According to the present invention, the test objects loaded into the casing through the input conveyor belt may be sequentially stacked on the test object casing positioned on the upper portion of the sub-stage, and moved to the test object inspection unit, and then the corners of the stacked battery cells may be inspected by the test object inspection unit, such that the total inspection may be performed on the battery cells, which are the test objects, at a high speed.

According to the present invention, when accurately inspecting, by radiography using X-rays or the like, the state of the electrodes of the battery cell sealed by the encapsulant, the three-dimensional images are reconstructed from the captured images of the plurality of stacked battery cells, such that a processing speed suitable to perform the total inspection may be provided and the inspection may be performed during a consistent process even in a case in which whether the battery cell has a defect is inspected for each battery cell.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1A:
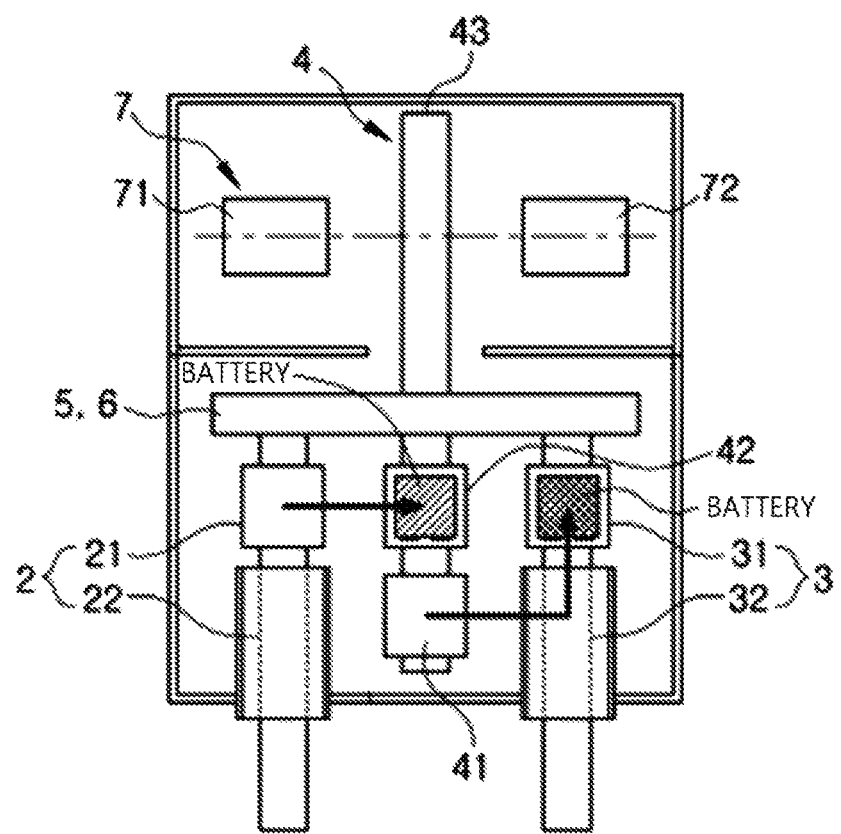
FIG. 1A is an exemplified view illustrating a battery inspection apparatus in the related art.
Figure 1B:
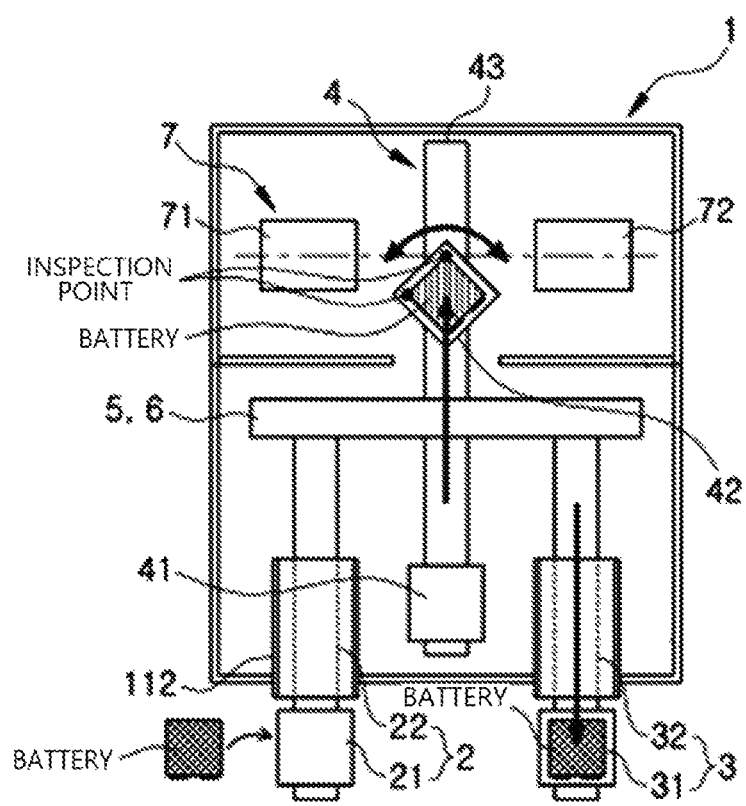
FIG. 1B is an exemplified view illustrating an operation of the battery inspection apparatus of FIG. 1A.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings.

Hereinafter, the present disclosure will be described in more detail with reference to the drawings. It should be noted that like reference numerals indicate like constituent elements in the drawings wherever possible. In addition, detailed descriptions of publicly-known functions and configurations, which may unnecessarily obscure the subject matter of the present invention, will be omitted.

When one constituent element is described as being "connected" or "coupled" to another constituent element, it should be understood that one constituent element can be connected or coupled directly to another constituent element, and an intervening constituent element can also be present between the constituent elements. In addition, throughout the specification of the present application, when one member is disposed "on" another member, this includes not only a case where the one member is brought into contact with another member, but also a case where still another member is present between the two members.

In the present invention, the terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof.

Figure 2:
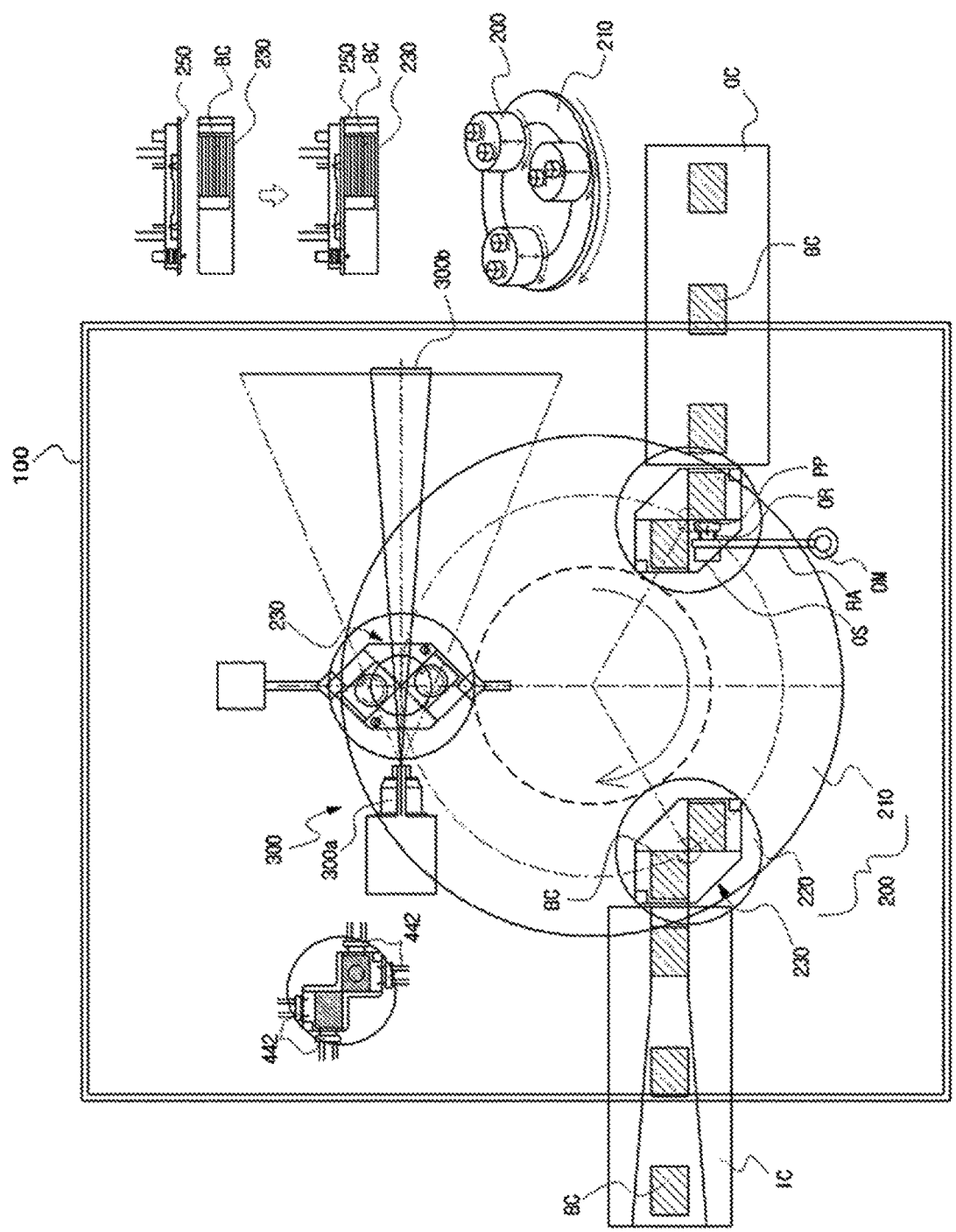
FIG. 2 is a top plan view illustrating an apparatus for inspecting battery cells for automation of total inspection according to the present invention, in which a test object casing and a mounting stage are illustrated.

First, FIG. 2 is a top plan view illustrating an apparatus for inspecting battery cells for automation of total inspection according to the present invention, in which a test object casing and a mounting stage are illustrated.

Referring to FIG. 2, an apparatus for inspecting battery cells for automation of total inspection according to an exemplary embodiment of the present invention includes a mounting stage 200 including a main stage 210 and sub-stages 220. The plurality of sub-stages 220 is rotatably provided at predetermined intervals and disposed in a circumferential direction on an upper portion of the rotatably provided main stage 210. The sub-stage 220 is provided to be movable upward and downward. In this case, the sub-stages 220 may be disposed at an equal interval in the circumferential direction on a concentric circle to a rotation axis of the main stage 210 and provided on the upper portion of the main stage 210 in order to load, inspect, and unload test objects BC. A rotational speed or a height of the sub-stage 220 may be adjusted.

A test object casing 230 is provided on an upper portion of each of the sub-stages 220 so as to be separable from the sub-stage 220. Battery cells BC, which are the test objects, are loaded from the outside into the test object casing 230 through an input conveyor belt IC and then stacked sequentially.

A test object inspection unit 300 is provided at the top side of FIG. 2 and configured to acquire an image of the test object BC by means of radiography after the test object casing 230 is moved to the test object inspection unit 300. In this case, the test object inspection unit 300 may include an X-ray generating unit 300a and an imaging detector 300b in order to perform X-ray inspection on the test object BC.

Meanwhile, as illustrated in a top plan view at the left upper part of FIG. 2, before the test objects BC stacked in the test object casing 230 are loaded onto the test object inspection unit 300, the test objects BC are aligned by test object alignment plates 442 operable by pneumatic pressure or the like. Thereafter, as illustrated in a front view at the upper right part of FIG. 2, the test objects BC are coupled by a separate test object cover 250 so that the test objects BC are prevented from moving. Therefore, the battery cells are prevented from moving even though the test object casing 230 is rotated during the imaging process, such that an accurate image of a corner of the test object BC may be acquired.

After the image is acquired, at a position at which the test object casing is positioned by the movement of the mounting stage, the stacked test objects BC are sequentially unloaded to the outside of the casing 100 by an output conveyor belt OC.

Figure 3:
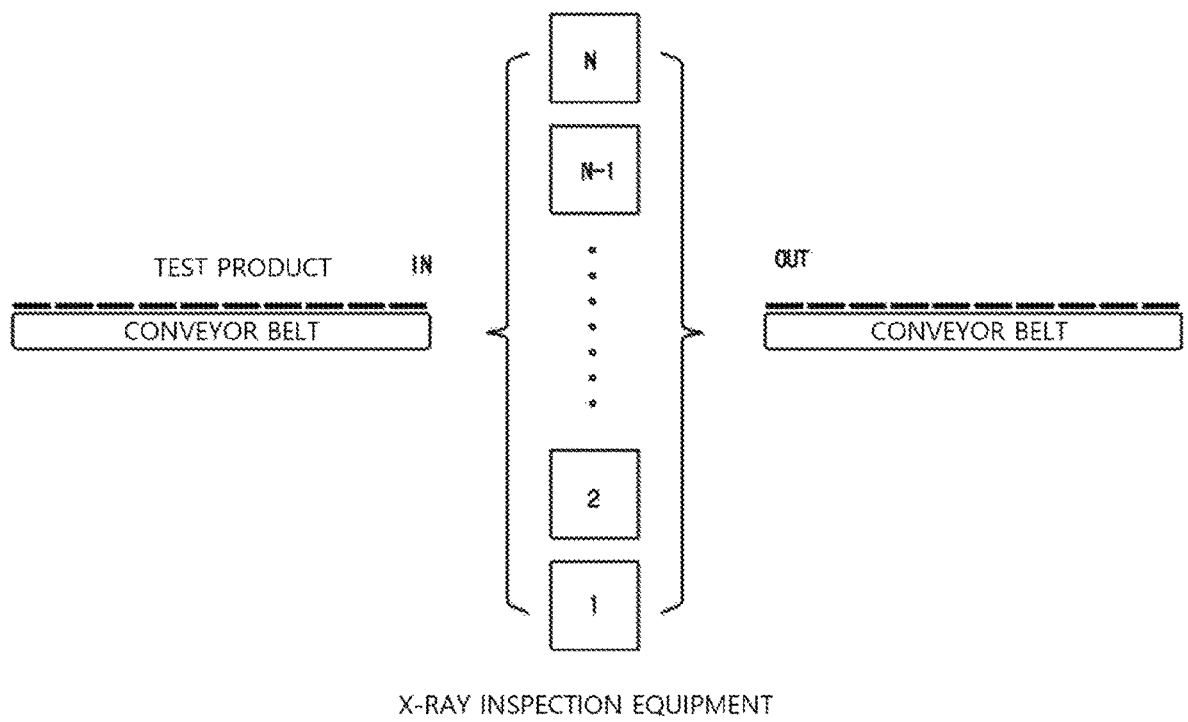
FIG. 3 is a conceptual view illustrating processes of loading, inspecting, and unloading the battery cells, which are test products, in the apparatus for inspecting battery cells for automation of total inspection according to the present invention.

Next, FIG. 3 is a conceptual view illustrating processes of loading, inspecting, and unloading the battery cells, which are test products, in the apparatus for inspecting battery cells for automation of total inspection according to the present invention. Referring to FIG. 3, the battery cells, which are the test products, may be loaded through the conveyor belt disposed at one side, and N battery cells are stacked in the order of 1, 2, . . . , N–1, and N, and then inspected by the radiographic inspection equipment using X-rays or the like, and then unloaded to the outside through the conveyor belt disposed at the other side.

For example, assuming that a flow rate time Tf of the test product moving along a production line is 8 seconds and an operating time Top taken for the X-ray inspection equipment to acquire and analyze an image is 240 seconds, the maximum 30 (N=30) battery cells may be stacked in the test object casing and then totally inspected through a consistent process without a bottleneck effect for 240 seconds taken for the test object inspection unit to perform the X-ray inspection.

Figure 4:
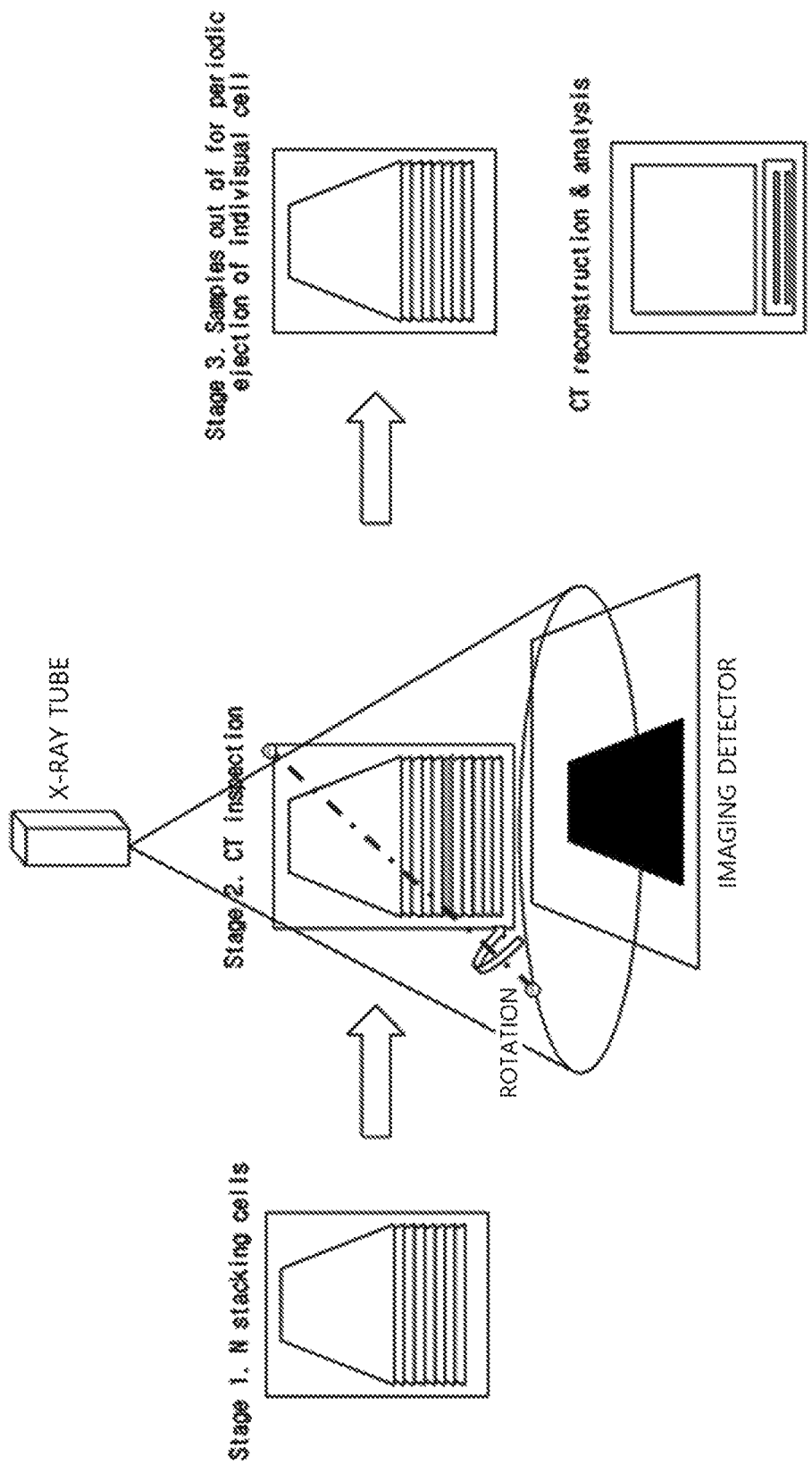
FIG. 4 is a conceptual view illustrating processes of performing CT imaging and analysis on the battery cells, which are test products, in the apparatus for inspecting battery cells for automation of total inspection according to the present invention.

FIG. 4 is a conceptual view illustrating processes of performing CT imaging and analysis on the battery cells, which are test products, in the apparatus for inspecting battery cells for automation of total inspection according to the present invention.

Referring to FIG. 4, it can be seen that the N battery cells are stacked in the first step, X-ray CT (computerized tomography) is performed in the second step, and CT reconstruction and analysis are performed in the third step while periodic ejection is performed on the individual battery cell. In this case, in the second step, the images may be acquired by the imaging detector using X-rays generated from an X-ray tube while the N battery cells are rotated about the rotation axis. As illustrated in FIG. 4, the images of the N stacked battery cells are simultaneously captured, such that a multi-point inspection capable of simultaneously capturing the images of the corners of the N battery cells, which are the test objects, and analyzing the images is performed.

Although not illustrated in the drawings, three-dimensional images are reconstructed from the two-dimensionally captured images of the corners of the battery cells which are acquired while rotating the battery cells, such that it is possible to accurately inspect whether the battery cell has a defect.

Figure 5:
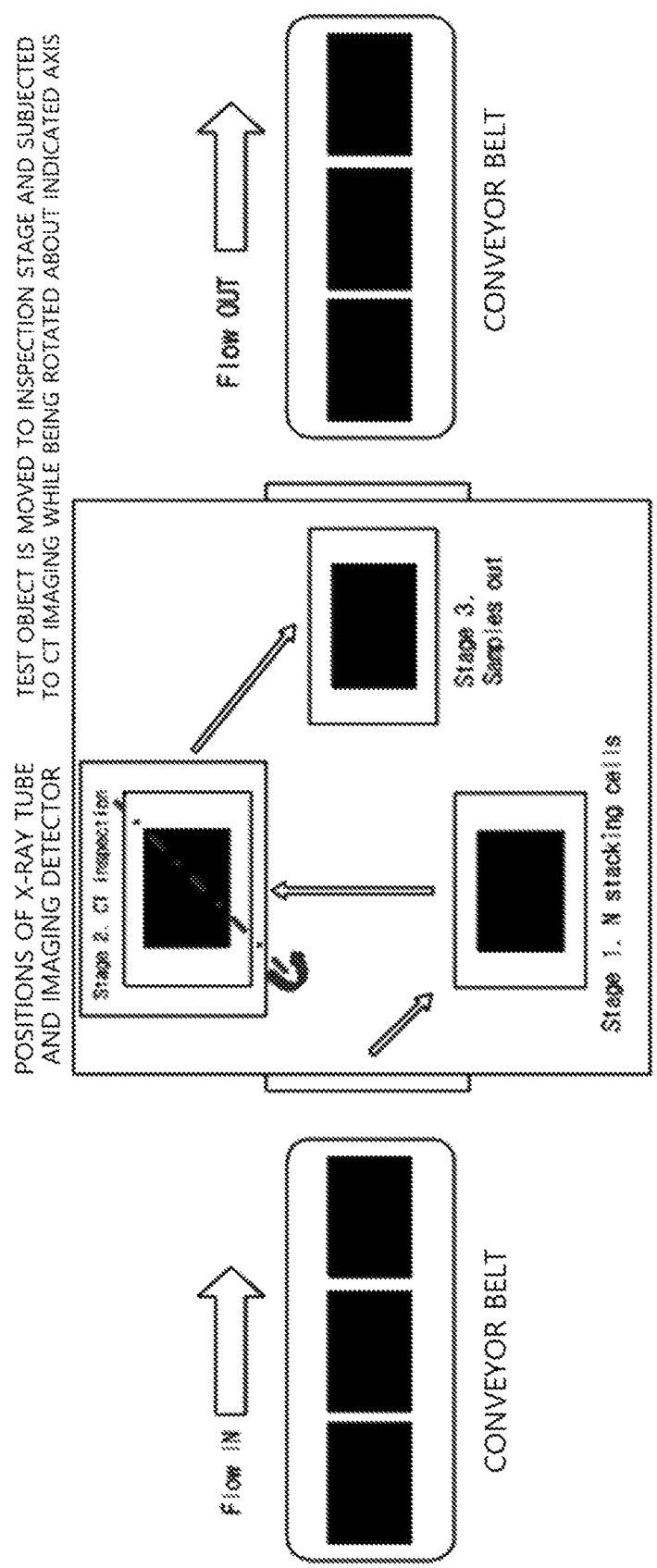
FIG. 5 is an exemplified view illustrating a circulation stage in the apparatus for inspecting battery cells for automation of total inspection according to the present invention.

Next, FIG. 5 is an exemplified view illustrating a battery cell inspection method using a circulation stage for automation of total inspection according to the present invention.

As illustrated in FIG. 5, the battery cell inspection method according to the present invention stacks the N battery cells, which are the test objects loaded into a test object inlet port by the conveyor belt at Stage 1 in the first step, performs the CT inspection while rotating the N stacked battery cells about the rotation axis at Stage 2 in the second step, and unloads the stacked battery cells one by one through the conveyor belt at Stage 3 in the third step.

Figure 6:
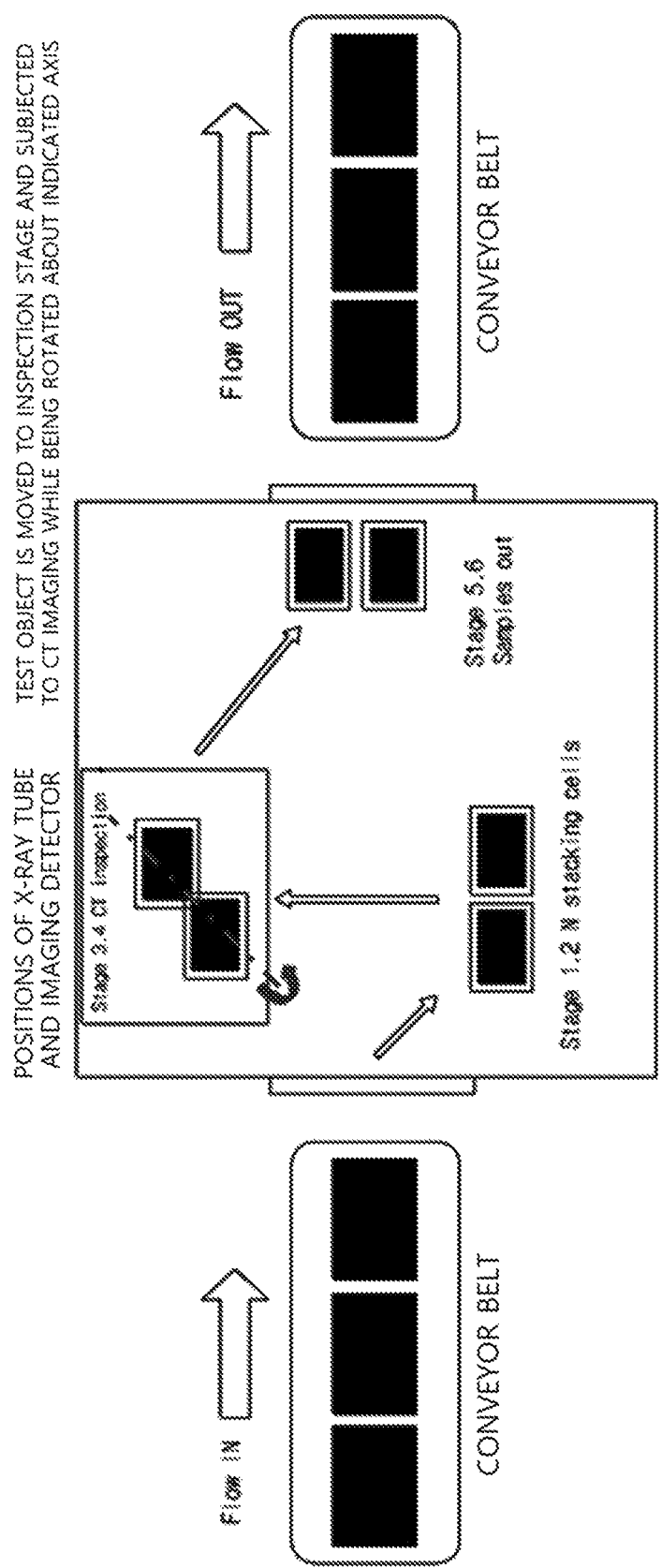
FIG. 6 is an exemplified view illustrating another exemplary embodiment of the circulation stage in the apparatus for inspecting battery cells for automation of total inspection according to the present invention.

FIG. 6 is an exemplified view illustrating another exemplary embodiment of the battery cell inspection method using the circulation stage for automation of total inspection according to the present invention.

As illustrated in FIG. 6, the battery cell inspection method according to the present invention stacks the N battery cells, which are loaded through the conveyor belt, in two rows, moves the N battery cells to the test object inspection unit, positions the N battery cells between the X-ray tube and the imaging detector at Stages 1 and 2 in the first step, performs the CT inspection on the N battery cells aligned in two rows while rotating the N battery cells about the indicated axis at Stages 3 and 4 in the second step, and unloads the battery cells one by one through the conveyor belt at Stages 5 and 6 in the third step.

The battery cell inspection methods, which are illustrated in FIGS. 5 and 6, respectively, differs from each other in that the battery cells, which are the test objects, are aligned in one row and two rows. However, basically, the battery cell inspection methods each include the first step, i.e., the "step of stacking the test objects BC" in which the N battery cells, which are the test objects loaded into the test object inlet port through the conveyor belt, are stacked, the second step, i.e., the "step of performing the CT inspection by rotating the stacked test objects" in which the CT inspection is performed while the N stacked battery cells are rotated about the rotation axis, and the third step, i.e., the "step of unloading, one by one, the stacked test objects BC inspected by the CT inspection" in which the stacked battery cells inspected by the CT inspection are unloaded one by one through the conveyor belt.

During the step of performing the CT inspection while rotating the stacked test objects BC, the step of stacking the test objects BC is performed at the sub-stage 220 positioned in the test object inlet port 120, and the step of unloading, one by one, the stacked test objects BC is performed at the sub-stage 220 positioned in a test object outlet port 130.

In the case in which the battery cells are stacked in two rows as described above with reference to FIG. 6, in the step of stacking the test objects BC, the test objects BC may be aligned and stacked in two rows so that the corners of the test objects BC stacked at one side face the corners of the test objects BC stacked at the other side.

If a large amount of time is required to perform the CT inspection and the number of battery cells, which may be loaded in one row, is not large due to a thickness of the battery cell, the battery cells may be aligned in two rows and then simultaneously inspected by the CT imaging. In the case in which the images are acquired by rotating the battery cells, which are aligned in two rows, about the one rotation axis, it is possible to inspect, simultaneously, at one time, the battery cells loaded in two rows.

Figure 7:
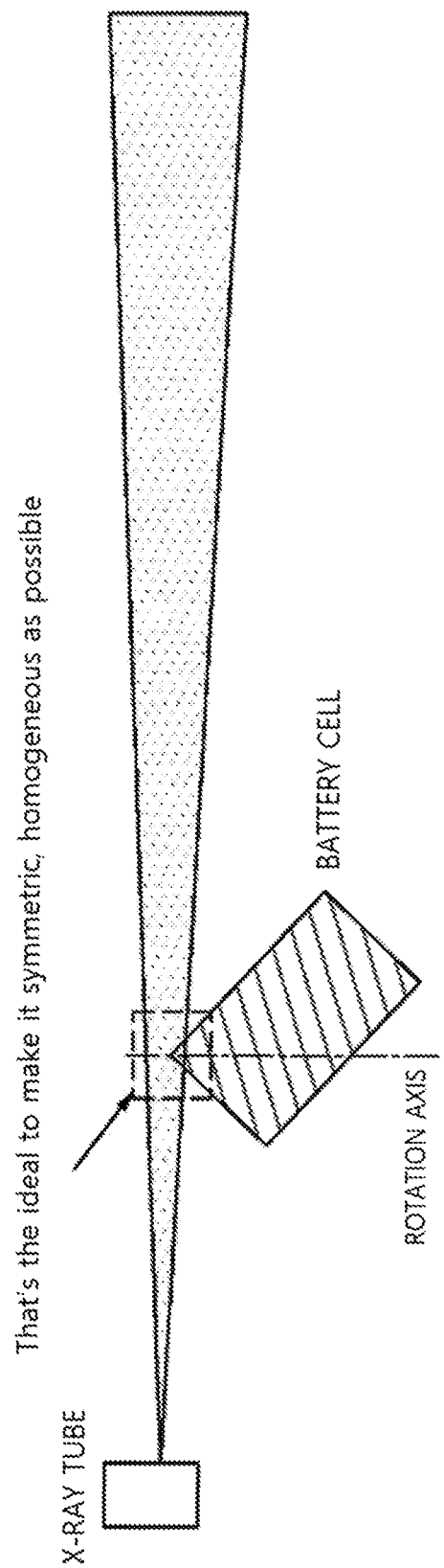
FIG. 7 is a conceptual view illustrating a CT rotation for capturing an image of a corner of the battery cell in the apparatus for inspecting battery cells for automation of total inspection according to the present invention.

FIG. 7 is an exemplified view illustrating a CT rotation for capturing an image of a corner of the battery cell in the apparatus for inspecting battery cells for automation of total inspection according to the present invention.

During the CT imaging, resolution of the captured image may greatly vary depending not only on a geometric structure of an object but also on an aligned state. In particular, the importance of alignment is higher in a thin battery cell because there is a very large relative difference between a thickness (about 2 mm) and a length (50 to 1500 mm) of the thin battery cell. This is because the image quality deteriorates if the absorption of radiation is very large in a particular direction. In order to ensure sufficient contrast, the intensity of the incident X-rays needs to be uniform at any angle, and the uniformity of the amount of the absorbed X-rays to an object needs to be ensured. In consideration of this, the battery cell may be rotated about a line segment that bisects one corner of the battery cell, as illustrated in FIG. 7.

That is, in the present invention, the step of performing the CT inspection may perform the CT inspection by rotating the stacked test objects BC about the line segment that bisects the corner when viewing the stacked test objects BC in a plan view, as illustrated in FIG. 7. More particularly, as illustrated in FIG. 4, the symmetric image may be obtained by rotating the stacked test objects about the line segment that bisects the corner of the test object placed on an imaginary plane positioned in the middle of the overall height of the stacked test objects BC.

As illustrated in FIGS. 8 to 14, a specified exemplary embodiment of the apparatus for inspecting battery cells for automation of total inspection according to the present invention includes a casing 100, the mounting stage 200, the test object inspection unit 300 and a test object alignment unit 400.

In this case, the casing 100 is provided to prevent a part of the radioactive ray from leaking to the outside during the process of inspecting, by using the radioactive rays, the test objects BC which are the battery cells. The casing 100 allows the test objects BC to easily enter the inside of the casing 100 from the outside, and also allows the loaded test objects BC to easily exit the casing 100 after being inspected by the test object inspection unit 300.

The casing 100 is configured by upper portion, lower portion and closed partition walls connecting the upper portion and the lower portion, and may be provided to be surrounded by a shield unit 110 in order to prevent the radioactive rays from leaking, thereby ensuring the operator's safety.

The test object inlet port 120 is disposed at one side of the casing 100 including the shield unit 110, and the test object outlet port 130, which corresponds to the test object inlet port 120, is disposed at the other side of the casing 100 including the shield unit 110, such that the test objects BC may be quickly loaded into the inside of the casing 100 from the outside and quickly unloaded to the outside from the inside of the casing 100, thereby improving workability.

The input conveyor belt IC is disposed in the test object inlet port 120 while penetrating the casing 100 between the inside and the outside, test object guide plates GP are disposed on an upper portion of the input conveyor belt IC, and the output conveyor belt OC is disposed in the test object outlet port 130 while penetrating the casing 100 between the inside and the outside.

In particular, the test object guide plates GP are provided on the upper portion of the input conveyor belt IC so that an interval between the test object guide plates GP is gradually decreased from the outside to the inside, the interval is decreased to be equal to the width of the test object BC, and the test object guide plates GP are parallel to each other at a portion where the interval is equal to the width of the test object BC. The battery cells are dropped onto upper surfaces of test object stage units 240 of the test object casing 230 seated on the upper portion of the sub-stage 220 to be described below, and then the battery cells may be sequentially stacked.

The plurality of test objects BC stacked in the test object casing 230 are inspected with the radioactive rays such as X-rays by the test object inspection unit 300 and then unloaded to the outside of the casing 100 through the test object outlet port 130. The output conveyor belt OC, which penetrates the casing 100 between the inside and the outside, is installed adjacent to the test object outlet port 130.

As illustrated in FIG. 2, a rotary arm RA having an arm drive motor DM is mounted at an end of an inlet side of the output conveyor belt OC disposed in the test object outlet port 130 while penetrating the casing 100 between the inside and the outside. The rotary arm RA may be tilted outside in order to prevent the rotary arm RA from interfering with the test object casing 230 seated on the upper portion of the mounting stage 200 while the mounting stage 200 is rotated by the main stage 210.

In this case, an output cylinder OS is provided at an end of the rotary arm RA. The output cylinder OS has a test object pushing piece PP provided at an end of an output cylinder rod OR and pushes the test objects BC one by one to transfer the test objects BC to the output conveyor belt OC.

Meanwhile, the mounting stage 200 operates such that the test objects BC, which are loaded from the outside into the casing 100 by being conveyed by the input conveyor belt IC, are sequentially stacked in the test object casing 230, the test object casing 230, on which the test objects BC are stacked, is moved to the test object inspection unit 300 to perform the X-ray inspection, and then the test object casing 230 is moved to the output conveyor belt OC so that the completely inspected test objects BC are sequentially unloaded to the outside of the casing 100.

The mounting stage 200 and the test object inspection unit 300 are positioned in the casing 100. The three or more sub-stages 220 used to load, inspect, unload the test objects BC are mounted on the upper portion of the rotatable main stage 210, such that the process time may be shortened and the inspection speed may be increased.

In addition, the main stage 210 of the mounting stage 200 is provided on the bottom of the casing 100 so as to be rotatable by a first motor M1, and the one or more sub-stages 220 may be provided at predetermined intervals on the upper portion of the main stage 210 so as to be rotatable by a separate second motor M2.

In this case, the first motor M1 and the second motor M2 each may be configured as a step motor to appropriately adjust the rotation amount. The second motor M2 may have a splined shaft coupled to the sub-stage 220 in order to move the sub-stage 220 upward or downward while rotating the sub-stage 220.

In particular, the first motor M1 configured to rotate the main stage 210 may be provided inside an edge of the main stage 210. A through hole is formed at a center of the main stage 210, and a lower end of a guide post is stably coupled to the portion where the through hole is formed. The guide post enables pressing cylinders 236 to be described below to reciprocate upward or downward. That is, in order to prevent the interference with the rotating main stage 210, the first motor M1 may be provided inside the edge of the main stage 210.

Figure 8:
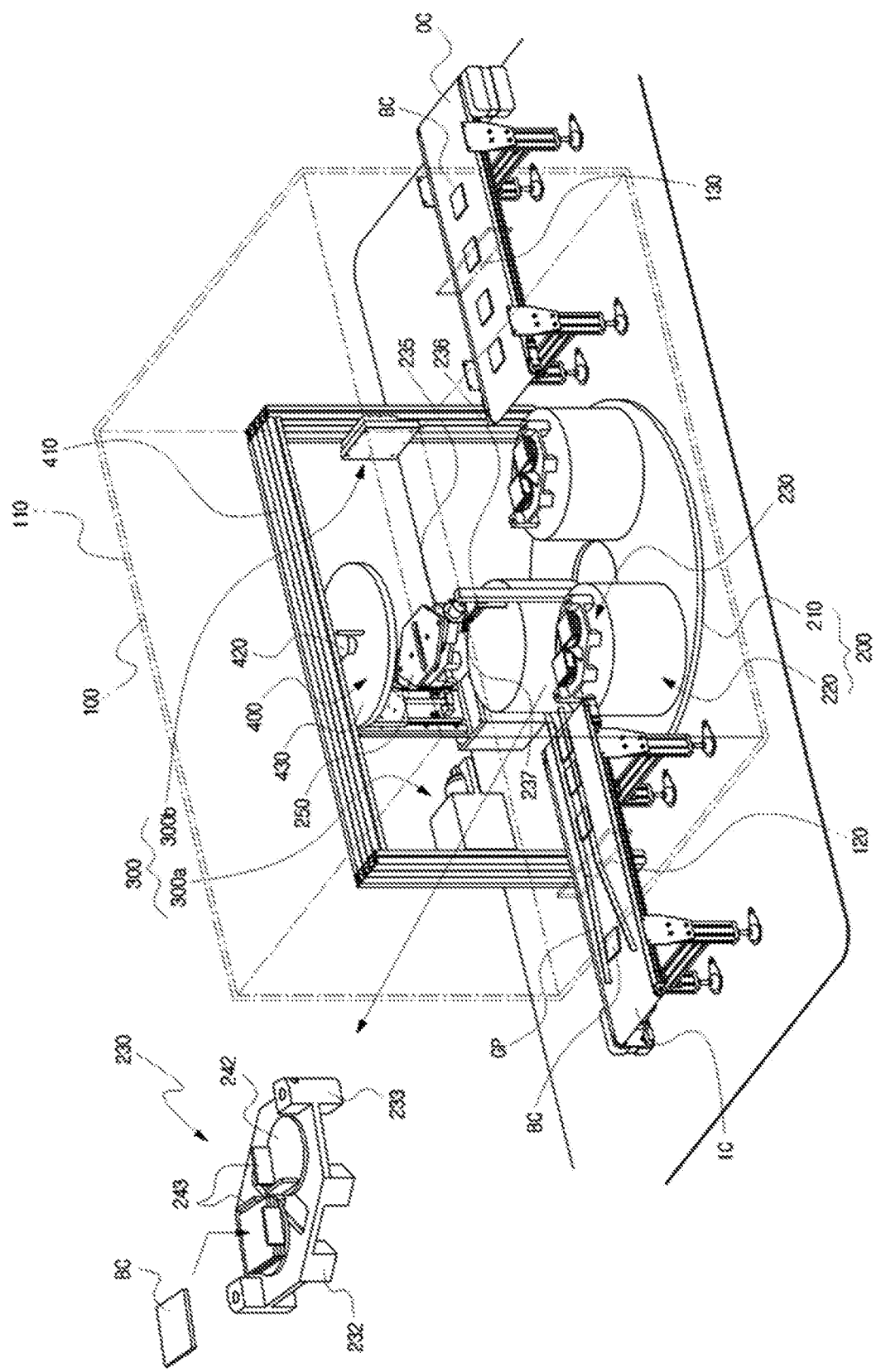
FIG. 8 is a perspective view illustrating a specified exemplary embodiment of the apparatus for inspecting battery cells for automation of total inspection according to the present invention.

As illustrated at the left side in FIG. 8, the test objects BC are sequentially stacked on the test object stage unit 240 positioned at one side of the test object casing 230 seated on the upper portion of the sub-stage 220, and then the sub-stage 220 is rotated so that the test objects BC are sequentially stacked on the test object stage unit 240 positioned at the other side of the test object casing 230. As a result, many test objects BC may be stacked in two rows on the test object casing 230.

The sub-stage 220 moves upward the test object casing 230 on which the test objects BC are stacked, such that the test object casing 230 is covered with the test object cover 250 and locked by connection terminal pressing members 235 provided in slip units 237 of the pressing cylinders 236 positioned between the X-ray generating unit 300a and the imaging detector 300b of the test object inspection unit 300 to be described below, thereby preventing the stacked test objects BC from being dropped or moved during the inspection process.

The sub-stage 220 includes a first lifting unit LF1 configured to move upward or downward, and the first lifting unit LF1 is configured as an actuator. The actuator is also configured to variably adjust a height thereof. A publicly known component such as a linear motor may of course be applied as long as the component may move the test object casing upward or downward.

Figure 9:
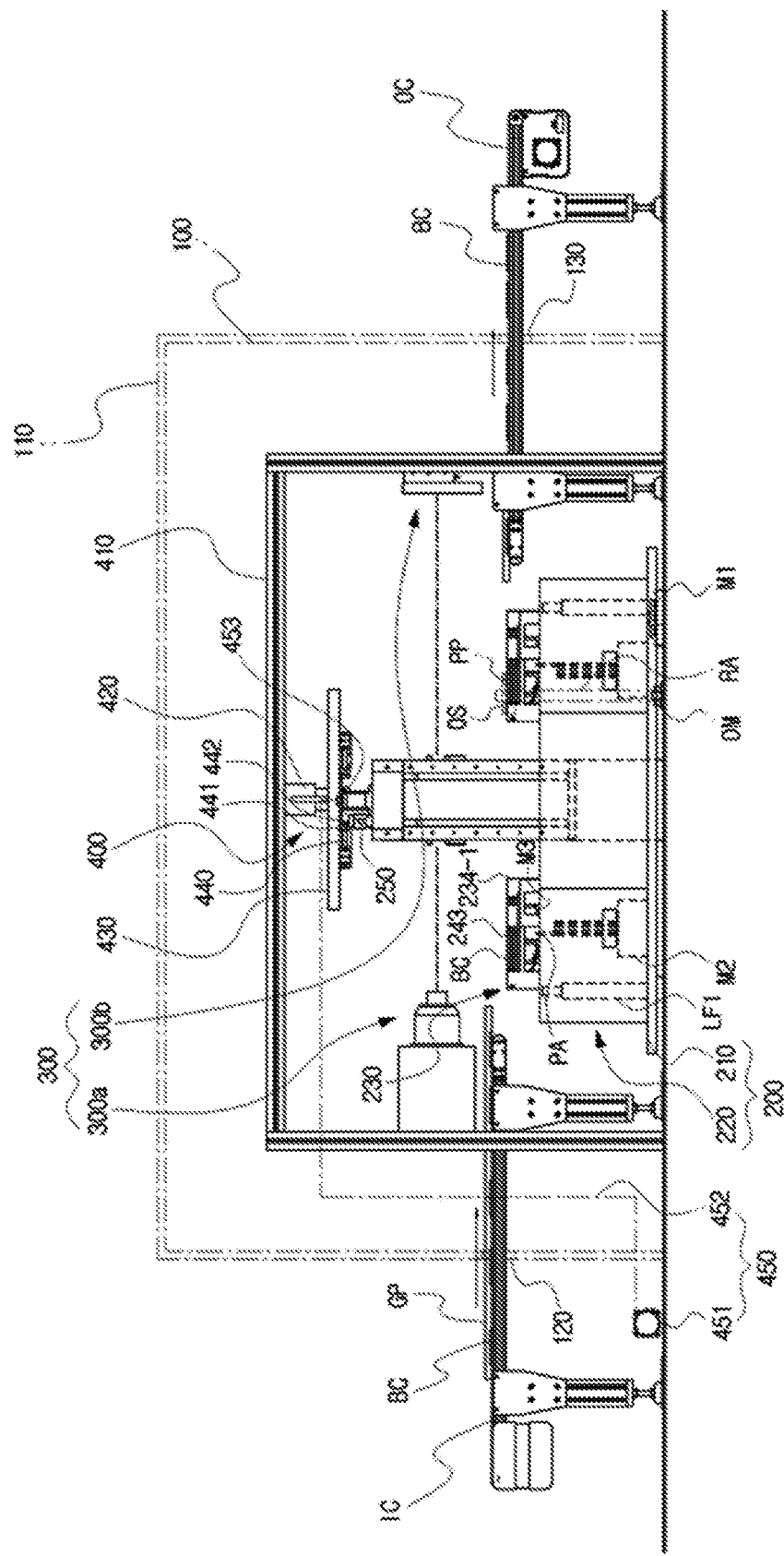
FIG. 9 is a front view illustrating the specified exemplary embodiment of the apparatus for inspecting battery cells for automation of total inspection according to the present invention.
Figure 10:
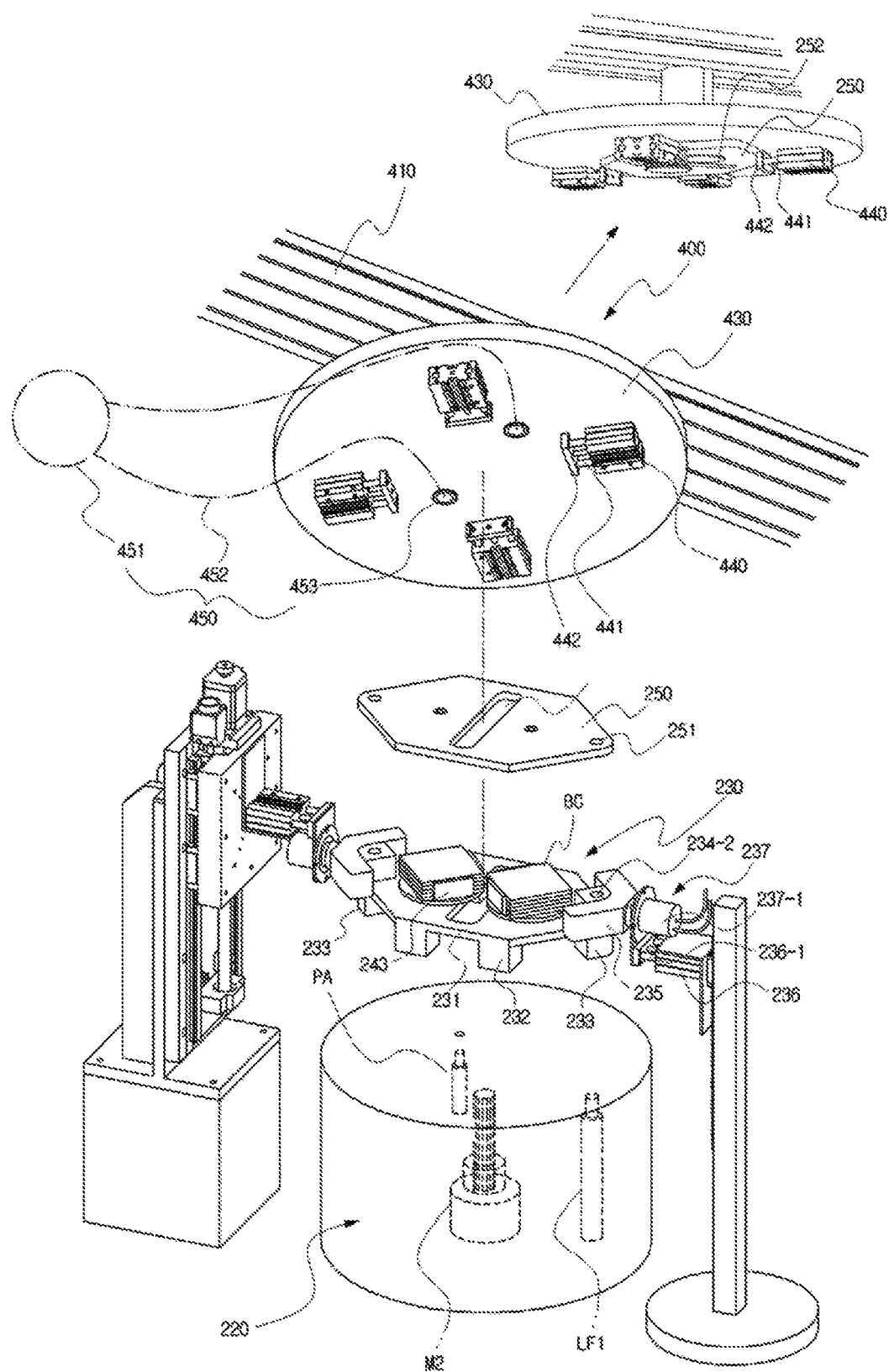
FIG. 10 is a perspective view illustrating a test object alignment unit and a state in which a test object cover is separated from the test object casing positioned at an upper side of a specified sub-stage in the apparatus for inspecting battery cells for automation of total inspection according to the present invention.

Meanwhile, the test object casing 230 on which the test objects BC are sequentially stacked is placed on the upper portion of the sub-stage 220, a push-up actuator PA is provided inside the sub-stage 220 on which the test object casing 230 is placed, as illustrated in FIGS. 9 and 10, and the sub-stage 220 is positioned at the test object outlet port 130 after passing through the test object inspection unit 300. In this state, when the push-up actuator PA operates, the push-up actuator PA may push upward the test object BC through a through hole formed in the sub-stage 220 and move the test object BC upward to the extent of a thickness of the test object BC. Thereafter, as illustrated in FIG. 2, the test object BC may be moved to the output conveyor belt OC by the test object pushing piece PP of the output cylinder OS provided on the rotary arm RA and then unloaded to the outside of the casing 100.

As illustrated in FIGS. 10 to 13, the test object casing 230 has a casing body 231 made of a non-metal material having high radiation transmittance. The casing body 231 has triangular extension portions 231-2 extending outward from both ends of a quadrangular flat plate portion 231-1. Casing legs 232 protrude downward from four corners of the quadrangular flat plate portion 231-1, such that the test object casing 230 is stably maintained horizontally on the upper surface of the sub-stage 220 and third motors M3 to be described below are prevented from interfering with the sub-stage 220.

Casing support members 233 protrude upward and downward at ends of the extension portions 231-2. Casing cover unlocking units 234 are provided on upper portions of the casing support members 233 protruding upward. The test object cover 250 to be described below is locked to prevent the test objects BC from moving during the inspection process by providing the case cover unlocking units 234, such that the precise inspection may be performed. After the inspection, the test object cover 250 is unlocked so that the test objects BC may be unloaded to the outside.

The test object stage units 240 are symmetrically provided at both sides of the upper portion of the casing body 231, such that the test objects BC may be stacked in two rows. The test object cover 250 covers the upper portion of the casing body 231 or is unlocked by the casing cover unlocking units 234.

Figure 11:
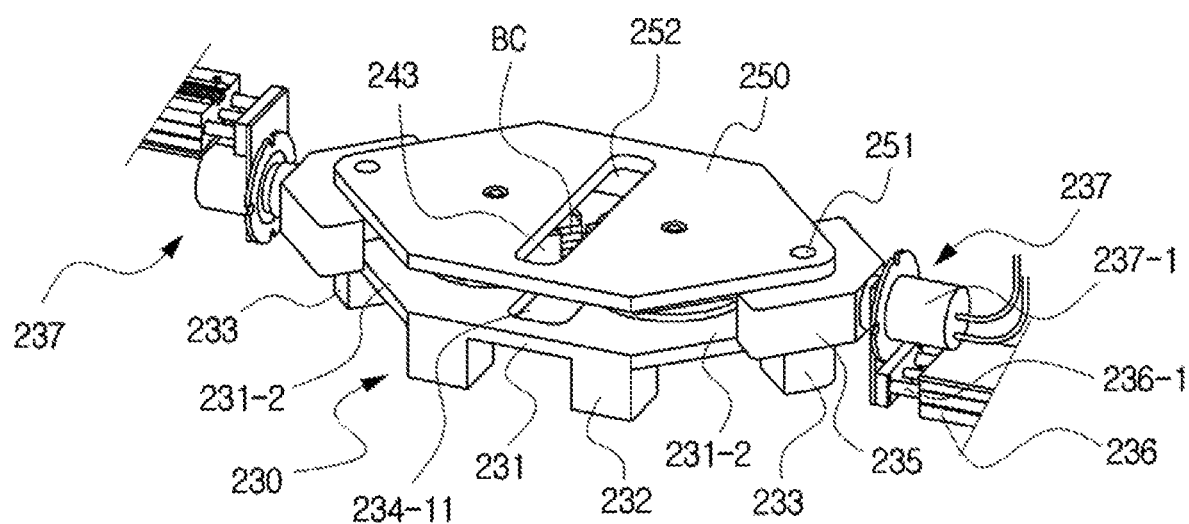
FIG. 11 is a perspective view illustrating a state in which the test object casing covered with the specified test object cover is coupled to a slip unit in the apparatus for inspecting battery cells for automation of total inspection according to the present invention.
Figure 12:
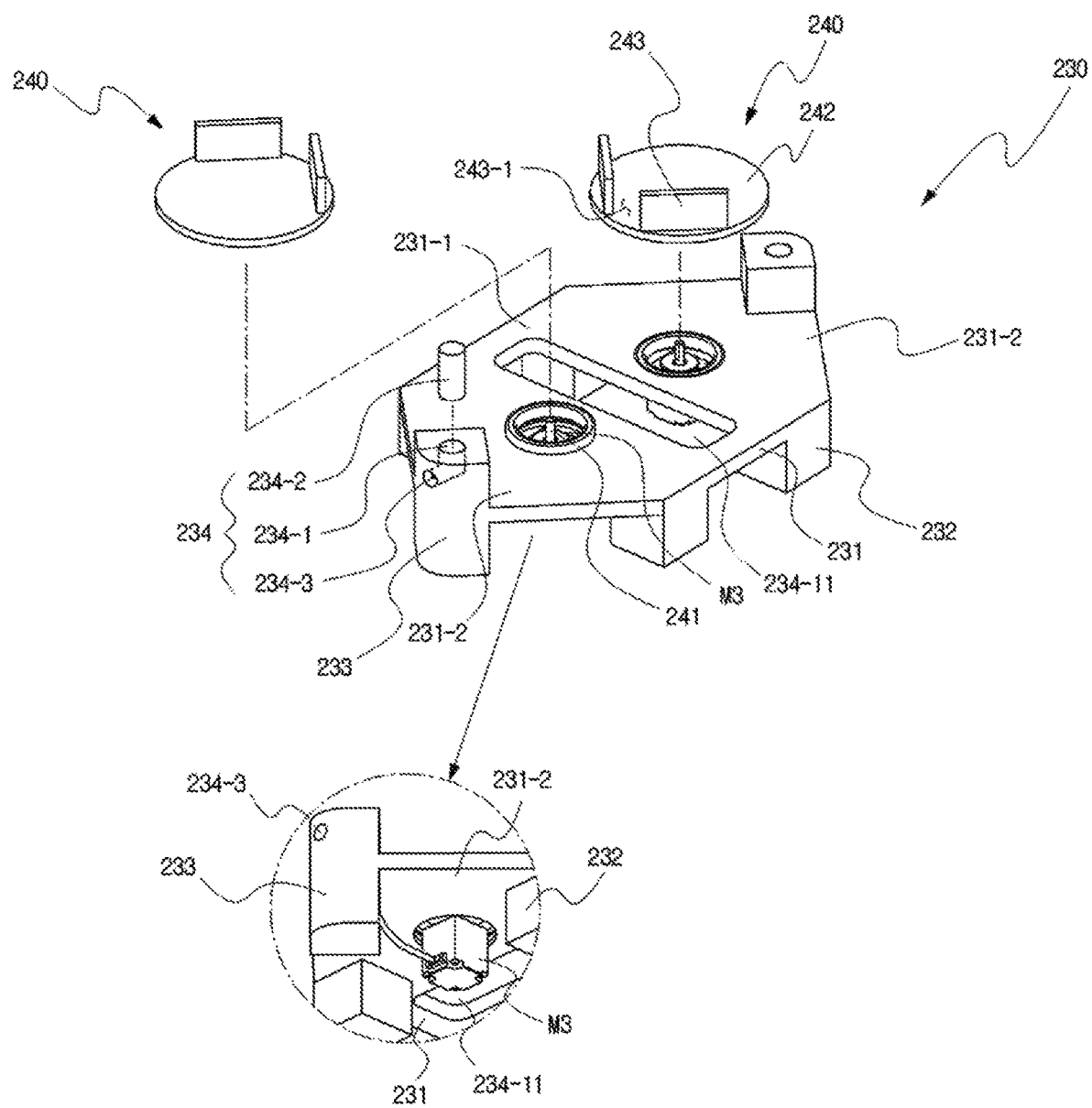
FIG. 12 is a perspective view illustrating a state in which the specified test object casing is separated in the apparatus for inspecting battery cells for automation of total inspection according to the present invention.
Figure 13:
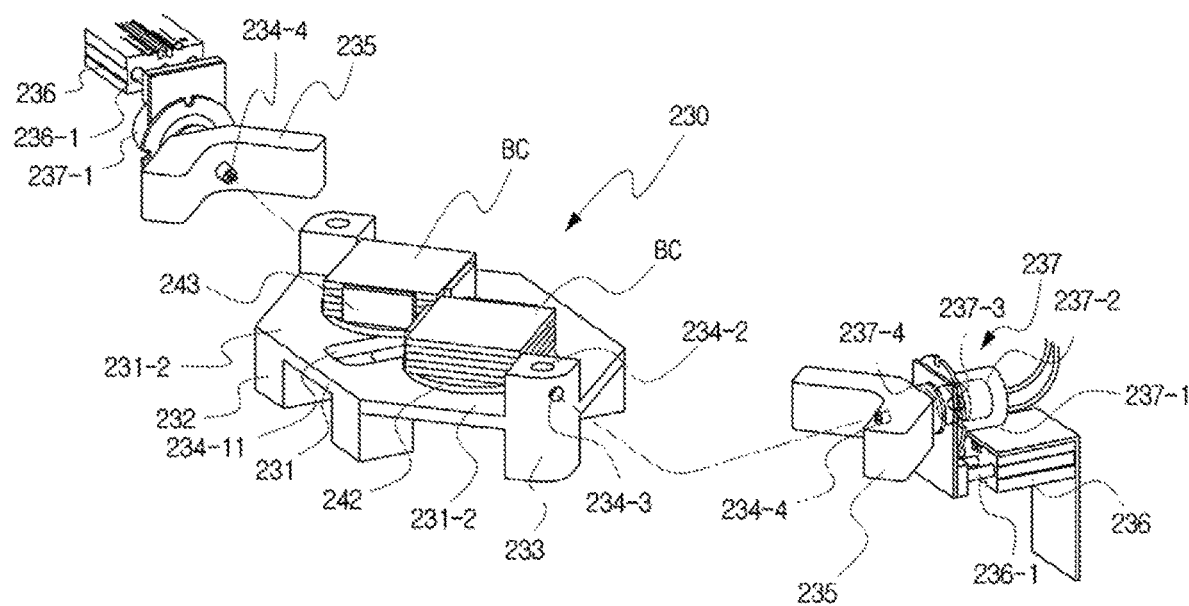
FIG. 13 is a perspective view illustrating a state in which the specified test object casing and the slip unit are separated in the apparatus for inspecting battery cells for automation of total inspection according to the present invention.

As illustrated in FIGS. 11 and 12, the casing cover unlocking unit 234 has an insertion groove 234-1 provided in the upper portion of the casing support member 233 and having a L shape, an electromagnet 234-2 inserted into a vertical portion of the insertion groove 234-1, and an inner connection terminal 234-3 inserted into a horizontal portion of the insertion groove 234-1 and connected to the electromagnet 234-2. Therefore, the test object cover 250 may be unlocked depending on whether magnetic force is generated based on an electrical signal applied from the outside through an outer connection terminal unit 234-4 connected to the inner connection terminal 234-3.

The outer connection terminal units 234-4 protrude in the connection terminal pressing members 235 that come into contact, in a > shape, with outer surfaces of the casing support members 233, such that the connection terminal pressing members 235 and the casing support members 233 may be easily connected and both ends of the test object casing 230 may be stably supported.

An outer side of a corner of the connection terminal pressing member 235 is coupled to the slip unit 237 coupled to pressing cylinder rods 236-1 of the pressing cylinder 236, such that the rotation may be facilitated by a supply of power.

The slip unit 237 has a slip motor 237-2 provided in a vacant slip housing 237-1, and a slip disc terminal 237-4 is provided on a slip motor shaft 237-3 of the slip motor 237-2, such that the slip disc terminal 237-4 may prevent a cable from being twisted by the slip motor 237-2 provided in the slip unit 237 when power is applied to the connection terminal pressing member 235.

Meanwhile, the test object stage unit 240 has the third motors M3 disposed at both sides of a first long hole 231-11 formed in the quadrangular flat plate portion 231-1, and each of the third motors M3 has a third motor shaft 241 protruding upward. A test object stage 242 is coupled to each of the third motor shafts 241. Test object alignment pieces 243 protrude at one side or the other side of an upper portion of the test object stage 242.

The test object alignment pieces 243 are two alignment pieces that face each other and have an angle of 90° therebetween. The images of the corners of the aligned test objects BC, which face each other, may be captured by the test object inspection unit 300 through test object corner exposing portions 243-1.

As illustrated in FIGS. 10 and 11, the test object cover 250 is made of a non-metal material and has the same shape as the casing body 231. Metal pieces 251 are provided at portions to be placed on the casing support members 233, and centers of the metal pieces 251 are coincident with centers of the electromagnets 234-2, such that the test object cover 250 is fixed to the casing body 231 by magnetic force of the electromagnets 234-2. Like the casing body 231, the test object cover 250 has a second long hole 252 formed at a center thereof.

The test object inspection unit 300 positioned above the mounting stage 200 includes the radioactive ray generating unit and the imaging detector 300b in order to perform the radiographic inspection on the test object BC. In particular, the radioactive ray generating unit may be the X-ray generating unit 300a for X-ray inspection.

In particular, in the case of the X-ray generating unit 300a, a tube voltage selected from 20 kVp to 500 kVp may be used in consideration of a material composition of the test object, and a focal spot size may be 0.01 μm to several hundred micrometers depending on a composition and a geometric structure of the test object. In this case, an open tube or a closed tube, which satisfies the tube voltage and the focal spot size, may be used.

As the imaging detector 300b, any one of a TFT photo diode type FPD (flat panel detector), a CMOS type FPD, and a CCD (digital radiography), among detectors in the form of image-forming optical systems, may be used in consideration of a composition and a geometric structure of the test object.

As illustrated in FIGS. 8 and 9, the test object alignment unit 400 is provided above the test object inspection unit 300 and has an alignment plate transfer cylinder unit 420 provided below an alignment support frame unit 410, and an alignment plate 430 is coupled to a lower portion of the alignment plate transfer cylinder unit 420.

As illustrated in FIG. 10, a plurality of alignment cylinders 440 is provided on a lower portion of the alignment plate 430. Test object cover suction units 450 are provided on the alignment plate 430 and disposed between the alignment cylinders 440. The test object cover suction units 450 suck the test object cover 250 with air suction power or separate the test object cover 250. In this case, the alignment cylinders 440 may be disposed on the lower portion of the alignment plate 430 at an interval of 90°, and the test object alignment plates 442 are mounted at ends of alignment cylinder rods 441 of the alignment cylinders 440.

The test object cover suction unit 450 has air hoses 452 and an air pump 451 that generates pressure required to suck the test object cover 250. One side of each of the air hose 452 is connected to a suction side of the air pump 451, and the other side of each of the air hoses 452 is connected to each suction nozzle 453 provided on the alignment plate 430.

Figure 14:
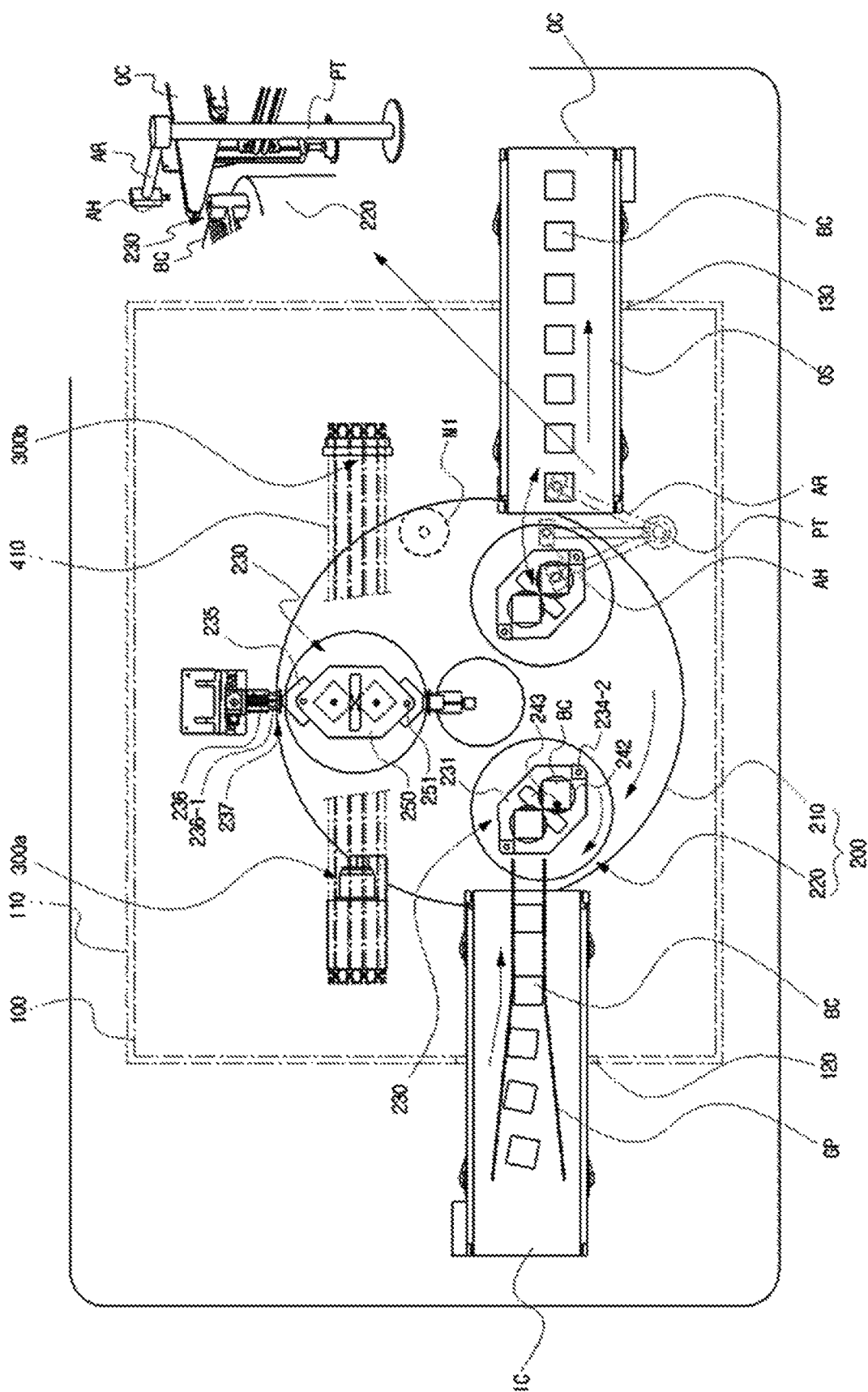
FIG. 14 is a specified top plan view illustrating the apparatus for inspecting battery cells for automation of total inspection according to the present invention.

Meanwhile, in the present invention, the test object BC may be moved to the output conveyor belt OC by the test object pushing piece PP of the output cylinder OS provided on the rotary arm RA and then unloaded to the outside of the casing 100. Other than this configuration, as illustrated in FIG. 14, an arm AR having a pneumatic head AH is rotatably provided on an upper portion of a support post PT, and the pneumatic head AH may suck the test objects BC one by one and then unload the test objects BC through the output conveyor belt OC.

First, the battery cell inspection method using the above-mentioned apparatus for inspecting battery cells for automation of total inspection starts with the process of transferring the battery cells, which are the test objects BC, onto the input conveyor belt IC exposed to the outside of the casing 100, and loading the test objects BC into the casing 100 through the test object inlet port 120.

Next, in the step of stacking the test objects BC, the test objects BC are loaded into the casing 100 and then dropped at the end of the input conveyor belt IC, such that the test objects BC are stacked on the test object stage units 240 of the test object casing 230 positioned on the upper portion of the sub-stage 220 of the mounting stage 200.

In this case, in the state in which the test objects BC are aligned at predetermined positions by the guide plates GP provided on the upper portion of the input conveyor belt IC, the test objects BC are sequentially stacked while being dropped onto the test object stage units 240. The test object alignment pieces 243 provided on the test object stages 242 prevent the test objects BC from moving during the process of stacking the test objects BC.

At the same time, the first lifting unit LF1 provided in the mounting stage 200 may provide an initial height of the mounting stage 200, that is, may allow the upper surface of the test object stage unit 240 to have a height made by subtracting a thickness(es) of one or two test objects BC from a height of the upper surface of the input conveyor belt IC. As a result, impact may be absorbed while the test objects BC are stacked by being dropped onto the upper surfaces of the test object stages 242 of the test object stage units 240.

The test objects BC are stacked on the test object stage 242 of the test object stage unit 240 provided at one side of the test object casing 230 by the repetition of the above-mentioned process, the mounting stage 200 is rotated by 180° by the second motor M2, and then the rotation of the mounting stage 200 is stopped. Further, with the same process, the test objects BC are stacked on the test object stage 242 of the test object stage unit 240 provided at the other side of the test object casing 230.

In this case, a rate of stacking of the test objects BC and the amount of stacking of the test objects BC may be compared with a predetermined weight or thickness by a weight measurement method using a pressure sensitive sensor or an optical method using a photoelectric sensor, and when the rate and the amount of stacking of the test objects BC are equal to or larger than the predetermined weight or thickness, stacking of the test objects BC may be held by locking the test object cover 250.

In the step of stacking the test objects BC, the test objects BC may be aligned and stacked in two rows so that the corners of the test objects BC stacked at one side face the corners of the test objects BC stacked at the other side.

When all of the test objects BC are stacked on the test object stages 242 disposed at both sides of the test object casing 230, the main stage 210 is rotated by the operation of the first motor M1, such that the test object casing 230 is positioned immediately below the test object alignment unit 400. Then, the sub-stage 220 is moved upward by the operation of the first lifting unit LF1, such that the casing body 231 of the test object casing 230 is positioned on a centerline between the X-ray generating unit 300a and the imaging detector 300b of the test object inspection unit 300.

Next, the alignment plate 430 is moved downward by the alignment plate transfer cylinder unit 420 of the test object alignment unit 400. Thereafter, the alignment cylinder rods 441 are extended by the operations of the alignment cylinders 440, such that the test object alignment plates 442 push, toward the test object alignment pieces 243, the test objects BC stacked on the test object stages 242 in order to align the test objects BC.

Thereafter, the alignment plate 430 is moved downward, and the test object cover 250 sucked by the suction nozzles 453 is separated from the lower portion of the alignment plate 430 at the same time as the air pressure generated by the air pump 451 and operated through the air hoses 452 and the suction nozzles 453 is eliminated. As a result, the lower portion of the alignment plate 430 is placed on the upper portions of the test objects BC, and then the alignment plate 430 is moved upward.

Next, the test object casing 230 is rotated by the second motor M2 so that a direction of the long hole 234-11 provided in the casing body 231 is coincident with a direction of the centerline between the X-ray generating unit 300a and the imaging detector 300b. Then, when the pressing cylinder rods 236-1 are extended by the operations of the pressing cylinders 236, the connection terminal pressing members 235 coupled to the slip disc terminals 237-4 of the slip units 237 are also extended, such that the connection terminal pressing members 235 come into contact with the casing support members 233 provided on the test object casing 230, the outer connection terminal units 234-4 are fitted with and connected to the inner connection terminals 234-3, and this state is maintained.

In this case, when power is applied to the outer connection terminal units 234-4 and the inner connection terminals 234-3 through the slip disc terminals 237-4, the metal pieces 251 provided on the test object covers 250 are attached by magnetic force, i.e., repulsive force generated by the electromagnets 234-2, and this state, i.e., the state in which the movements of the test objects BC are restricted to prevent the test objects BC from moving is maintained.

Next, the step of performing the CT inspection by rotating the stacked test objects BC is performed. The test object casing 230 is rotated by the slip motors 237-2 of the slip units 237 while the X-rays generated from the X-ray generating unit 300a of the test object inspection unit 300 pass through the corner exposing portions 243-1 aligned by the test object casing 230 and the test object cover 250. Therefore, two-dimensional images are acquired by the imaging detector 300b for each rotational position, and a 3D reconstruction process is performed based on the acquired two-dimensional images.

In this case, in order to continuously inspect other points of the test objects BC, the test object stages 242 provided on the upper portion of the test object casing 230 are rotated by the operations of the third motors M3 provided below the casing body 231, images of corners at the other subsequent positions are captured, and then the 3D reconstruction process may be performed. In this case, in the step of performing the CT inspection by rotating the stacked test objects BC, the CT inspection may be performed by rotating the stacked test objects about the line segment that bisects the corner of the stacked test objects BC when viewing the stacked test objects BC in a plan view.

When the inspection of all of the test objects BC stacked on the test object casing 230 is completed, the supply of power to the electromagnets 234-2 is cut off, and then the alignment plate 430 is moved downward by the alignment plate transfer cylinder unit 420 of the test object alignment unit 400. Further, when the suction power is applied to the suction nozzles 453 from the air pump 451, the test object cover 250 is separated by being sucked to the lower portion of the alignment plate 430.

Next, the sub-stage 220, which is on standby at the lower side, is moved upward by the first lifting unit LF1, such that the casing legs 232 of the test object casing 230 are seated on the sub-stage 220. Next, the pressing cylinder rods 236-1 are retracted into the pressing cylinders 236, and the connection terminal pressing members 235 are separated from the casing support members 233 of the test object casing 230, such that the restrictive force is eliminated.

Next, in the step of unloading, one by one, the stacked test objects BC inspected by the CT inspection, when the sub-stage 220 is moved downward by the reverse operation of the first lifting unit LF1, the main stage 210 is rotated by the operation of the first motor M1, such that the test object casing 230 inspected by the inspection is positioned at the input side of the output conveyor belt OC. When the rotary arm RA is rotated by the arm drive motor DM, the test object pushing piece PP provided on the output cylinder rod OR of the output cylinder OS is positioned above the test object alignment pieces 243 provided on the test object stages 242 of the test object casing 230.

Thereafter, the test object BC positioned at the uppermost side is pushed by the test object pushing piece PP by the operation of the output cylinder OS and then loaded onto the output conveyor belt OC. As this process is repeated, all of the test objects BC stacked on the test object stage 242 at one side are unloaded. In this case, the push-up actuator PA provided on the upper portion of the mounting stage 200 protrudes upward through the long hole 234-11 formed in the quadrangular flat plate portion 231-1, such that the test object BC seated at the lowermost end may be unloaded onto the output conveyor belt OC.

During the step of performing the CT inspection while rotating the stacked test objects BC, the step of stacking the test objects BC is performed at the sub-stage 220 positioned in the test object inlet port 120, and the step of unloading, one by one, the stacked test objects BC is performed at the sub-stage 220 positioned in a test object outlet port 130.

Next, the test objects BC, which are completely inspected and stacked on the test object stage 242 at the other side, may also be unloaded by the repetition of the same process as the test object casing 230 is rotated by the mounting stage 200.

The rotation of the main stage 210 by the first motor M1 moves the test object casing 230, which is vacant after all of the inspected test objects BC are unloaded, to the portion where the input conveyor belt IC is positioned, and the process of stacking the test objects BC on the test object casing 230 is repeated, such that the total inspection is performed on the battery cells.

Meanwhile, in the present invention, the test object casing 230 is moved upward as the sub-stage 220 is moved by the operation of the first lifting unit LF1, and the test object casing 230 may be rotated in the state in which the test object casing 230 is supported by the pressing cylinders 236 coupled to the connection terminal pressing members 235 which are on standby. However, other than this configuration, the sub-stage 220 may be stationary, and the pressing cylinders 236 coupled to the connection terminal pressing members 235 may be moved from the upper side to the lower side or from the lower side to the upper side. In this case, as illustrated in FIGS. 2 to 4, the pressing cylinder 236 may have a structure in which a driving shaft connected to a motor operates forward or reversely along a guide rail provided on a vertical guide post in order to reciprocate a slider, and the pressing cylinder 236 is coupled to the slider.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for inspecting battery cells for automation of total inspection, the apparatus being configured to inspect the battery cells with radiography and comprising:
   a main stage configured to be rotatable;
   a plurality of sub-stages rotatably disposed on an upper portion of the main stage;
   a mounting stage comprising the main stage and the sub-stages;
   a test object casing rotatably disposed on an upper portion of each of the sub-stages so that test objects are sequentially stacked on the test object casing; and
   a test object inspection unit configured to acquire images of the test objects by radiography at a position at which the test object casing is moved by the mounting stage.

2. The apparatus of claim 1, wherein after the images are acquired, the stacked test objects are sequentially unloaded from the test object casing at a position at which the test object casing is positioned by movement of the mounting stage.

3. The apparatus of claim 1, wherein the main stage is provided to be rotatable about a center of the main stage, the sub-stages are disposed on the upper portion of the main stage at predetermined intervals in a circumferential direction in order to load, inspect, and unload the test objects, a rotation and a height of each of the sub-stages are adjusted, and the test object inspection unit acquires images of corners of the stacked test objects by rotating the test object casing.

4. The apparatus of claim 1, wherein the mounting stage and the test object inspection unit are positioned in a casing, the plurality of sub-stages comprises three or more sub-stages mounted on the upper portion of the rotatable main stage in order to load, inspect, and unload the test objects, the test object inspection unit comprises a radioactive ray generating unit and an imaging detector in order to perform radiographic inspection on the test objects, and a test object alignment unit is provided above the test object inspection unit.

5. The apparatus of claim 4, wherein the casing comprises:
   a shield unit provided to surround the casing in order to prevent radioactive rays from leaking;
   a test object inlet port provided at one side of the casing comprising the shield unit; and
   a test object outlet port provided at another side of the casing comprising the shield unit.

6. The apparatus of claim 5, wherein an input conveyor belt, which penetrates the casing between an inside and an outside, is disposed in the test object inlet port, test object guide plates are disposed on an upper portion of the input conveyor belt, and an output conveyor belt, which penetrates the casing between the inside and the outside, is disposed in the test object outlet port.

7. The apparatus of claim 4, wherein the main stage positioned on a bottom surface of a lower portion of the casing is rotated by a first motor, the sub-stage positioned on the upper portion of the main stage is rotated on the main stage by a second motor, and the sub-stage comprises a first lifting unit that moves the sub-stage upward or downward.

8. The apparatus of claim 4, wherein the test object alignment unit comprises:
   an alignment support frame unit;
   an alignment plate transfer cylinder unit provided below the alignment support frame unit;
   an alignment plate coupled to a lower portion of the alignment plate transfer cylinder unit;
   a plurality of alignment cylinders provided on a lower portion of the alignment plate; and
   a test object cover suction unit provided on the alignment plate and configured to suck a test object cover with air suction power and separate the test object cover.

9. The apparatus of claim 8, wherein the alignment cylinders are provided on the lower portion of the alignment plate and have an interval of 90° therebetween, and test object alignment plates are provided at ends of alignment cylinder rods of the alignment cylinders.

10. The apparatus of claim 8, wherein the test object cover suction unit comprises:
    an air pump;
    an air hose having one side connected to a suction side of the air pump; and
    a suction nozzle provided on the alignment plate and connected to another side of the air hose.

11. The apparatus of claim 1,
    wherein the test object casing comprises:
    a casing body having extension portions integrally provided at both ends of a quadrangular flat plate portion, the extension portions each having a triangular shape and extending outward;

casing legs protruding downward from four corners of the quadrangular flat plate portion;

casing support members protruding upward and downward from ends of the extension portions;

casing cover unlocking units provided on upper portions of the casing support members;

test object stage units symmetrically provided at both sides of an upper portion of the casing body; and a test object cover configured to cover the upper portion of the casing body and be unlocked by the casing cover unlocking units.

12. The apparatus of claim 11, wherein the casing cover unlocking unit comprises:

an insertion groove provided on an upper portion of a casing support member and having a L shape;

an electromagnet fixedly inserted into a vertical portion of the insertion groove;

an inner connection terminal inserted into a horizontal portion of the insertion groove and connected to the electromagnet; and an outer connection terminal unit connected to the inner connection terminal.

13. The apparatus of claim 12, wherein the outer connection terminal unit is provided to protrude inside a connection terminal pressing member that comes into contact, in a > shape, with an outer surface of the casing support member.

14. The apparatus of claim 13, wherein an outer side of a corner of the connection terminal pressing member is coupled to a slip unit provided on a pressing cylinder rod of a pressing cylinder, and the slip unit comprises:

a slip housing;

a slip motor provided in the slip housing; and a slip disc terminal provided on a slip motor shaft of the slip motor.

15. The apparatus of claim 12, wherein the test object cover has a same shape as the casing body, a metal piece, which is coincident with a center of the electromagnet, is provided at a portion of the test object cover which is placed on the casing support member, and the test object cover has a second long hole at a center thereof.

16. The apparatus of claim 11, wherein each of the test object stage unit comprises:

a third motor provided at either side of a first long hole provided in the quadrangular flat plate portion, the third motor having a third motor shaft protruding upward;

a test object stage coupled to the third motor shaft; and test object alignment pieces protruding from one side or another side of an upper portion of the test object stage.

17. The apparatus of claim 16, wherein the test object alignment pieces have an angle of 90° therebetween, and test object corner exposing portions are spaced apart from each other and provided at corners of the test objects which face each other.

18. A method of inspecting battery cells for automation of total inspection, the method comprising:

stacking test objects;

performing CT (computerized tomography) inspection by rotating the stacked test objects; and unloading one by one the stacked test objects inspected by the CT inspection, wherein during the performing of the CT inspection by rotating the stacked test objects, the stacking of the test objects is performed at a sub-stage positioned at a test object inlet port, and the unloading of the stacked test objects one by one is performed at a sub-stage positioned at a test object outlet port.

19. The method of claim 18, wherein in the stacking of the test objects, the test objects are stacked in two rows so that corners of the test objects stacked at one side face corners of the test objects stacked at another side.

20. The method of claim 18, wherein in the performing of the CT inspection, the CT inspection is performed by rotating the stacked test objects about a line segment that bisects corners of the stacked test objects when viewing the stacked test objects in a plan view.

* * * * *